March 27, 1956 L. L. CARRICK ET AL 2,739,997
STORAGE BATTERY
Filed April 15, 1952 3 Sheets-Sheet 1
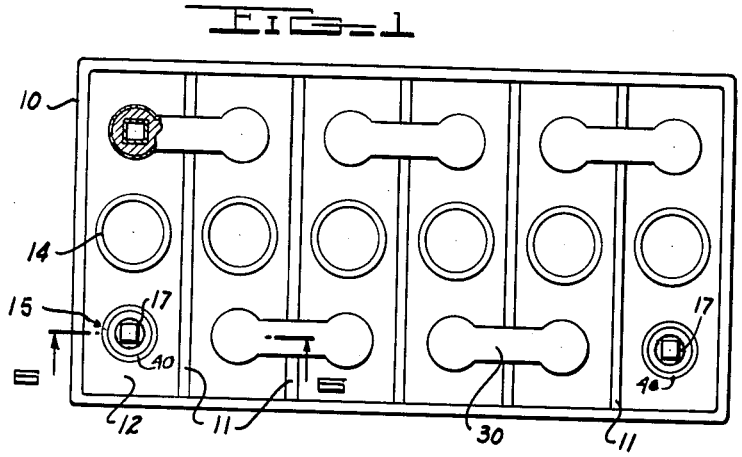
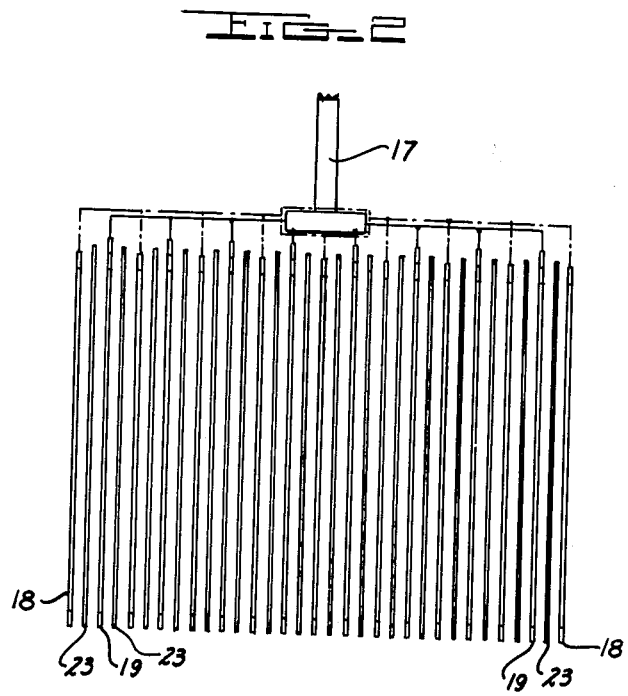
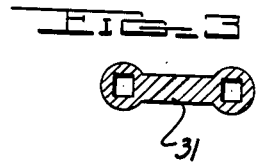
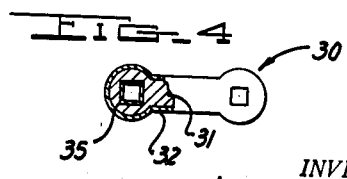
INVENTORS.
Leo L. Carrick
BY John M. Stapleton
Arthur M. Smith
ATTORNEY

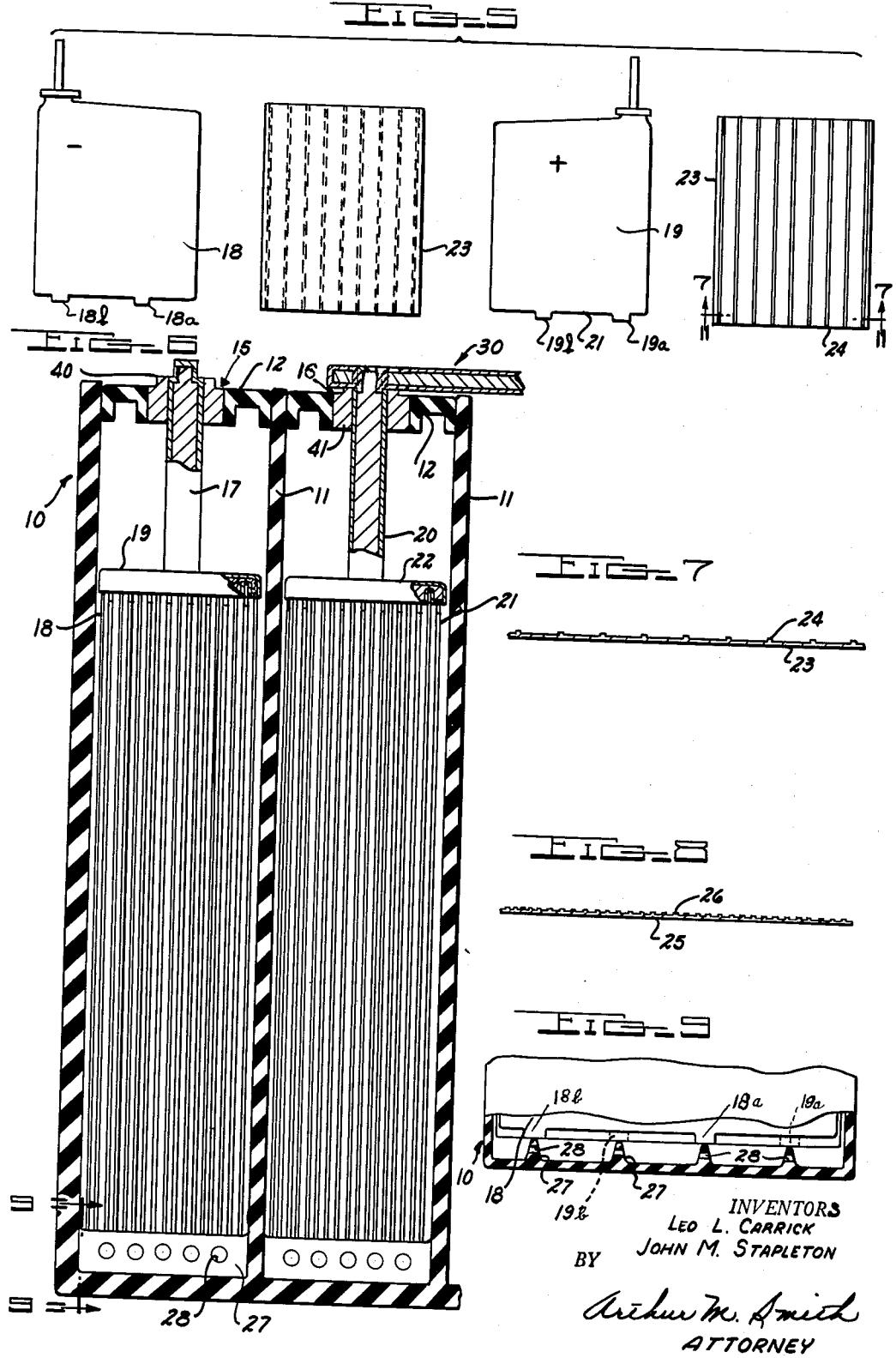

March 27, 1956     L. L. CARRICK ET AL     2,739,997
STORAGE BATTERY
Filed April 15, 1952     3 Sheets-Sheet 3
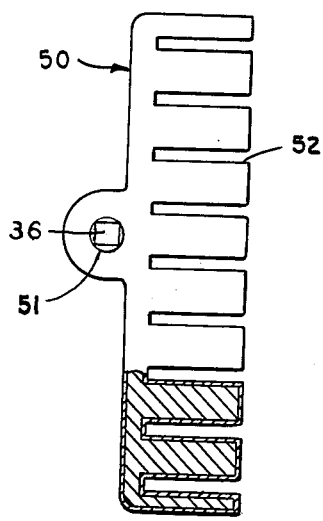
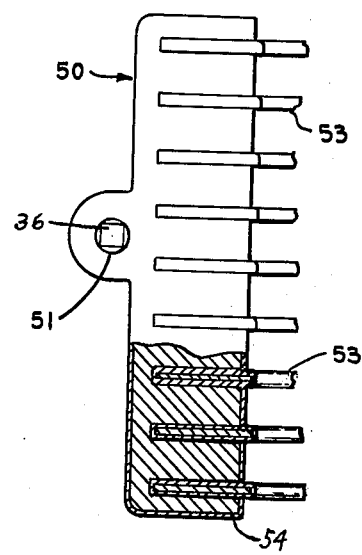
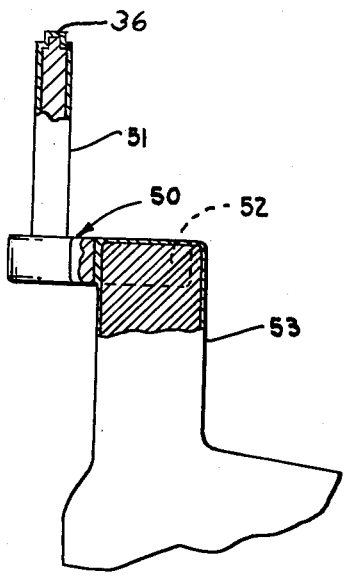
INVENTORS.
LEO L. CARRICK
BY JOHN M. STAPLETON
Arthur M. Smith
ATTORNEY

United States Patent Office 2,739,997
Patented Mar. 27, 1956

2,739,997

STORAGE BATTERY

Leo L. Carrick, Ann Arbor, and John M. Stapleton, Breckenridge, Mich., assignors to Regents of the University of Michigan, Ann Arbor, Mich., a corporation of Michigan Application April 15, 1952, Serial No. 282,342

2 Claims. (Cl. 136—57)

The present invention relates to electric storage batteries or accumulators of the lead-acid type. The invention is particularly concerned with providing such a storage or secondary cell which is capable of high current output at low temperatures and in which the weight relative to the unit of capacity is substantially reduced. The present invention provides a battery having a reduced internal resistance over batteries of the conventional lead-antimony grid type and thus produces a battery having an increased watt-hour capacity per pound of finished battery.

The battery of the present invention is particularly designed to meet exacting standards of performance at temperatures ranging from 165° F. to –65° F. The battery is designed to maintain a constant high power output over a long period of time and saves both space and weight compared with commercial batteries now in use. The battery also maintains its charge for long periods of time when not in use.

It has been the aim of the electric storage battery manufacturers to produce from lead-antimony grids and lead oxide paste a secondary battery that will weigh less and have a greater watt-hour efficiency per pound of finished battery at low temperatures of the order of –65° F. to –75° F. Such batteries as iron-nickel and cadmium-nickel and batteries which have calcium-lead grids or lead-silver grids or lightweight metal grids with a barrier coat of copper, iron and lead, or lightweight metal grids coated with insulating lacquer, resin insulation, rubber compound or some suitable insulating layer, which is subsequently coated with lead, all have defects, such as lack of charge retention, low five-second voltage and a short—or no—discharge time interval with sufficient voltage to meet industrial requirements at –65° F.

The watt-hour discharge capacity per pound depends upon a high average discharge voltage. In the past these have been relatively low because the five-second voltage has been low, which is due in part to the internal resistance of the plates, the weight of the battery or a lack of sufficient plate surface area per given cell volume.

The watt-hour capacity efficiency at high rate discharges on a 45 ampere hour lead-antimony secondary battery at a discharge rate of 50 to 300 amperes at a temperature of 80° F., and especially at temperatures of 0° F., –40° F., and –65° F., have been so low that the efficiency of the battery has been either impaired or has been so reduced that it has failed to perform as desired.

Internal resistance in batteries of the lead-acid type are due to the dimensions of the cell, the cross section and nature of the path through which current flows, the relatively small area of electrode in contact with the electrolyte, and the thickness and distance between the plates. In addition, the conventional types of lead-acid batteries have been found to have a substantial amount of self-discharge at the negative plate due to electrical couples which are set up between the antimony in the lead-antimony alloy of the grid and the spongy lead in the presence of the electrolyte. In the positive plates, while there is less self-discharge than in the negative plates, a considerable amount of self-discharge has been noted because of the lead-antimony couple present in such plates.

It is, therefore, an object of the present invention to provide a storage battery of the lead-acid type in which the weight of the battery relative to the unit of capacity is substantially reduced and which is capable of high current output at low temperatures.

It is a further object of the present invention to provide a storage battery capable of providing extremely high sustained currents even at low temperatures and which will deliver a predetermined amount of energy at a high rate for a short period of time at low temperatures without excessive loss of voltage.

A further object of the present invention is to provide a storage battery having specially constructed positive and negative plates and electrodes which are formed of readily available materials and in which the design of the plates and electrodes are such that the cell may be modified in such a manner as to establish optimum conditions for minimal internal resistance, the size of the current path and the conductivity of the said path being such as to provide an efficient current flow from the plates.

It is a further object of the present invention to provide a storage cell in which the plates are so formed as to provide a large surface area which is in contact with the electrolyte and in which the conductivity of the plates is such as to carry current to the cell terminals without excessive drop in voltage.

It is a further object of the present invention to provide a storage battery in which the plates forming the cells are so constructed as to permit a substantial decrease in the distance between the plates in the cell, thus reducing the internal resistance within the cell.

It is a further object of the present invention to provide a storage battery of the lead-acid type in which self-discharge at both the negative plates and the positive plates is substantially reduced to the point where there is very little self-discharge of the cell.

It is a further object of the present invention to provide a storage battery in which the available surface area of the active materials is increased over that of conventional battery constructions, thus providing for increased reaction with the electrolyte, and reducing the amount of active material required in a given plate while increasing the voltage potential thereof at high discharge rates and at low temperatures.

It is a further object of the present invention to provide a storage battery of the lead-acid type having minimal internal resistance characteristics thus providing a maximal high watt-hour capacity per pound of finished battery.

It is a further object of the present invention to provide a novel storage battery of the lead-acid type in which the cell posts, plate straps, cell straps, and cell terminals are reduced in weight and increased in efficiency over similar conventional items formed of lead or lead-antimony materials.

A further object of the present invention is to provide a storage battery of the lead-acid type in which provision is made to facilitate the ready discharge of hydrogen evolved at the plates, thus further reducing resistance within the cell.

It is a further object of the present invention to provide a storage battery of the lead-acid type in which an improved type of separator is provided to facilitate the discharge of gas without trapping the same in the battery and in which provision is made in the battery case to improve circulation of the electrolyte.

It is a further object of the present invention to provide a storage battery of the lead-acid type in which the lead coating thickness may be varied in the positive and negative plates, thus permitting a saving in plate weight without impairing the battery efficiency and life.

It is a further object of the present invention to provide a storage battery of the lead-acid type in which the cell terminal posts and the plate connector comb are formed as a one-piece light-weight metal casting, having suitable electrical conductivity, which is lead coated and connected electrically and mechanically with the connector straps of the battery plates.

Other objects of this invention will appear in the following description and appended claims, reference being had to the accompanying drawings forming a part of this specification wherein like reference characters designate corresponding parts in the several views.

In the drawings:

Fig. 1 is a top plan view of a storage battery embodying the present invention with parts of a cell strap broken away to show the cell terminal connections;

Fig. 2 is a schematic view showing the arrangement of plates and separators in one of the cells of the battery shown in Fig. 1;

Fig. 3 is a sectional view of a blank used in forming one of the cell connector straps used in the battery shown in Fig. 1;

Fig. 4 is a plan view with a part of the covering broken away and part shown in section of a completed cell connector strap as used in the battery shown in Fig. 1;

Fig. 5 is an exploded view showing the relative arrangement and locations of the negative and positive plates and the separators used in the battery shown in Fig. 1;

Fig. 6 is an enlarged sectional view taken substantially on the line 6—6 in the direction of the arrows Fig. 1;

Fig. 7 is a sectional view taken substantially on the line 7—7 in the direction of the arrows Fig. 5;

Fig. 8 is a sectional view similar to Fig. 7, but showing a modified form of separator construction;

Fig. 9 is a fragmentary sectional view taken substantially on the line 9—9 in the direction of the arrows Fig. 6;

Fig. 10 is a top plan view with parts broken away and partially in section and showing an integral terminal post and plate strap formed of a cast light-weight electrically conductive metal provided with a pure lead coating;

Fig. 11 is a view similar to Fig. 10 but showing the battery plates connected with the plate strap; and Fig. 12 is a side elevation with parts broken away and shown partially in section of the terminal post, plate strap and plates shown in Fig. 11.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, the battery embodying the present invention comprises a battery case 10 formed of any suitable material, such for example as vulcanized hard rubber, plastic-lined light-weight metal, or the like. It is divided into a plurality of cells by means of cross partition members 11. Each cell of the battery is provided with a cover 12 which is provided with a centrally located removable vent cap 14 which provides access to the cell for purpose of filling with electrolyte, adding water, or observing the general condition of the cell. Each of the covers 12 is sealed to the battery case by any suitable means such as any conventional plastic battery sealing compound.

The covers 12 are also provided with bushed openings 15 and 16 through which the terminal posts project. As shown in Fig. 6, the terminal post 17 extends through the opening 15 provided in the pure lead bushing 40 in the cover 12 and is connected with each of the thin battery plates 18 by means of the plate strap 29. The terminal post 20 extends through the opening 16 in the pure lead bushing 41 and is connected with each of the thin battery plates 19 by means of the plate strap 22.

A separator 23 is provided between each negative and positive plate. On each side of the positive plates 21 the separator 23 is provided with a plurality of spaced vertically extending ribs 24 so that gas evolved during the charge or discharge of the cell will be directed out of the electrolyte through the channels provided between the said ribs 24.

The separators 23 may be formed of any desired type of suitable materials for this purpose, but it has been found desirable to use smooth surfaced, substantially imperforate or micro-porous materials, such as a smooth ribbed sheet of dielectric plastic material or the like. The use of separator materials of this nature prevents rapid lead migration to the negative plate and prevents the excessive localized build up of such lead which causes the phenomena of "treeing." If lead "trees" on the negative plate, the danger of short circuiting the plates is increased. It is desirable that the separator be kept approximately to the thickness of the positive plate. In a given distance, for example if the separator is approximately 0.040" in thickness each rib of the separator is approximately .025" thick and the web between the ribs is approximately .015" thick. Thus, the depth of the channel formed between the spaced parallel ribs 24 will be approximately .025".

In the form of the separator 23 shown in Figs. 5 and 7, the vertical ribs 24 are spaced a greater distance apart than in the modified form of separator shown in Fig. 8 and indicated generally by the numeral 25. In the separator 25 the ribs 26 are spaced closer together than in the separator 23, but the thickness of the separators and the nature of the separator material and surface is the same as described in connection with the separator 23.

As shown in Figs. 6 and 9, the bottoms of each of the negative plates 18 and the positive plates 19 are supported by the lugs 18a and 19a respectively on alternate spaced parallel bridges 27 formed in the bottom of the battery case 10.

Each of the lugs 18a and 18b and 19a and 19b is substantially twice as long as comparable lugs used in conventional battery constructions. Thus the bottom edges 21 of the plates are supported above the bottom of the battery cell case a greater distance than in conventional battery constructions. This provides an increased volume of electrolyte in the bottom of the battery cell case immediately beneath the battery plates. As here shown, each of the plate supporting bridges 27 is drilled as indicated by the numeral 28 to provide a plurality of parallel holes extending therethrough to improve the circulation of the liquid electrolyte within each cell. It has been found that the increased volume of electrolyte in the bottom of each cell and the circulation of this electrolyte in the cell improves the performance of the cell. The improved circulation of the electrolyte in combination with the smooth surface of the separators 23 or 25 also facilitates the expulsion of the gas formed during discharge or charging of the cells.

In the battery construction as here provided, each of the negative plates 18 and each of the positive plates 19 is formed to provide a very thin plate in which the internal structure is formed of aluminum or an alloy, or magnesium or an alloy, thereof on which is deposited a pure lead coating. The specific plate construction is covered in our co-pending application Serial No. 282,341, filed April 15, 1952, now Patent 2,713,079 and assigned to our common assignee and is, therefore, not herein described in detail. Reference is hereby made to said co-pending application for any additional details which may be deemed necessary for an adequate disclosure of the present invention. These plates may be formed in any desired manner but one preferred manner is shown in co-pending application, Serial No. 289,964 filed May 26, 1952, now abandoned, and also assigned to our common assignee and covering a Method, Process and Apparatus for Electro-Depositing Pure Lead upon Aluminum or Aluminum Alloys.

In a preferred embodiment, the thicknesses of the plates used may for example be preferably .030 inch for the negative plates and .040 inch for the positive, although considerable leeway in plate thickness is possible depending upon the particular characteristics desired. This difference in thickness of the negative and positive plates is the result of changing the thickness of the lead coatings thereon. We have found a lead coating of 0.010″ thick on the negative plates suitable in a battery construction in which the positive plates are coated with a lead coating 0.015″ thick. We have determined that it is not necessary to provide as heavy an initial lead coating on the negative plate as is provided on the positive plate because there is a lead migration from the positive to the negative plate. By recognizing this phenomenon we can thus vary the thickness of the plates and effect an appreciable saving in weight of the battery. Also, if desired, the savings in space thus effected will permit the addition of extra plates, thus increasing the electrical output from the cell without increasing the dimensions.

The use of plates and separators within the dimensions mentioned will provide a battery cell having very high efficiency and having a high discharge rate at low temperatures per given cell volume. The use of the thin plates provides an increased surface area for contact between the electrolyte and the active materials. Using thicker plates as in conventional practice may provide the same amounts of active materials, but because of the nature of the construction of these plates the surface area available for contact between the active materials and the electrolyte is substantially less than that provided herein. In view of the thinness of the plates and the separators, it is thus possible to provide a larger number of plates in a given cell volume than is possible with conventional types of plates used in conventional lead-acid battery constructions.

The use of a large number of plates in a given cell volume means that the space available for circulation of the electrolyte is somewhat reduced, thus the provision of the ribbed portions 24 and 26 on the separators 23 and 25 not only assures an adequate spacing of the plates but also provides unrestricted channels through which the electrolyte may be circulated to aid in carrying off the gas evolved during the charge and discharge of the cell, and adequate amounts of electrolyte are provided at all times.

The plurality of drilled holes 28 in the bottom bridge 27 also improve the circulation of the electrolyte as previously described and thus assists in providing a battery construction having an increased output per unit of weight.

In order to further reduce the weight of the completed battery, the terminals 17 and 20 and the cell connector straps 30 are preferably formed of a lightweight internal core of a suitable aluminum alloy or the like coated with a suitable lead covering. In Fig. 3 we have shown a blank 31 formed of aluminum or aluminum alloy which may be used in forming one of the cell connector straps 30. As shown in Fig. 4, the blank 31 is coated with a coating of lead indicated by the numeral 32. This also may be accomplished by the method disclosed in our said co-pending application Serial No. 289,964. The terminal cell posts 17 and 20 and plate straps also are preferably formed of a lightweight central core of aluminum or an aluminum alloy which is suitably lead coated.

Referring to Figs. 1, 11 and 12, we have shown our novel plate strap and terminal construction which provides a lightweight element having the desired strength properties to assure a long useful service life under extreme conditions. As here shown, we may provide post 17 and strap 29, and post 20 and strap 22 as a single casting 50 of any suitable lightweight relatively flexible electrically conductive metal such as aluminum, magnesium or the like or alloys thereof. Casting 50 is formed to provide an integral terminal post 51 and a battery plate comb 52 having a plurality of spaced teeth which define the spaces in which the battery plates 53 are located, as shown in Fig. 11. It will be appreciated that plates 53 will in one instance correspond to negative plates 18 and will in another instance correspond to positive plates 19, and that comb 52 will in one instance correspond to plate strap 29 and will in another instance correspond to plate strap 22. The casting 50 is coated with a pure lead coating 54 of any desired thickness in any desired manner. After coating the casting 50, the battery plates 53 are placed in the spaces between the teeth of the comb 52 and heat and molten lead is applied thereto which causes the lead coating of the comb 52 and the plates 53 to become welded and fused into a continuous coating which positively connects the battery plates with the plate strap both mechanically and electrically.

The body portion of the terminal post 51 is cylindrical in shape and is an integral part of the cast comb construction. This eliminates any possibility of relative movement between the terminal post and the plate strap such as may occur when the parts are formed separately and joind by a lead weld or the like. The end of the terminal posts 51 are preferably cast or machined to provide a rectilinear end having flat side portions which assure a positive mechanical connection with the cell straps as hereinafter more fully described.

The use of an aluminum core or skeleton in the formation of the plates 18 and 19, the cell terminals 17 and 20, the cell connector straps 30, and the plate straps 22 and 29 not only results in a reduction in weight of the battery, but also provides a low resistant element having a high current carrying efficiency. The strength and flexibility of the aluminum or aluminum alloy core or body in each of these elements permits building up of a coating of pure lead as distinguished from an alloy of lead, such for example as lead-antimony, such as is used in conventional constructions. Thus, the mechanical parts of the battery are so formed as to be of relatively light weight, but of high strength, flexibility and low resistance.

The lead plate applied to the various parts as outlined above may be heated with an oxygen acetylene flame, hydrogen-oxygen flame, oxygen-gas flame, and the lead melted and shaken from the surface, but there will still remain on the surface sufficient lead to securely weld lead to the surface without blistering, and the lead will be adherent as if not previously removed.

In order to prevent relative twisting between the cell straps 30 and the ends of the cell terminals 17 or 20, we provide the construction shown in Figs. 1, 3 and 4 in which each cell strap 30 is provided with a rectilinear straight sided, female opening 35. The rectilinear male ends 36 of the terminals 17 and 20 fit loosely in the rectilinear female openings in the cell straps 30 and are connected by an intervening layer of pure lead which is melted and fused therein. By this construction any force exerted on the cell straps 30 which otherwise would cause them to be rotated about the terminal ends 36 is taken by the mechanical construction here shown as well as the intervening lead weld layer.

The electroplate of lead is not disturbed during burning into the plate straps 29 and 22, hence there is no seepage or porosity developed from the lead burning. Thus, the plate straps 19 and 22 form a continuous conductive path which is intimately connected with the lead coating on the plates. If desired, the plate straps 29 and 22 may be formed entirely of lead.

The elimination of the lead-antimony materials in the structural parts of the battery eliminates the electrical couple which is formed between the lead, the antimony and the electroyte and thus reduces the self-discharge properties noted in batteries of the conventional type.

It will be seen from the foregoing that the internal resistance in the battery has been reduced. The construction also provides a large area of the electrically active materials in the plates which are in direct contact at all times with the electrolyte. The plates are of a sufficient cross section and of such electrical conducting efficiency that current is carried to all of the terminals without excessive drop in voltage. The use of thin plates placed very close together decreases the distance between the plates and hence aids in decreasing the internal resistance of the cell. The circulation of the electrolyte in combination with the smooth surfaced separators carry away the small bubbles of evolved gas during discharge or charging of the cell and carries the gas rapidly away from the electrode, thus further reducing internal resistance during the discharge or charge of the cell. The provision of the openings in the bridge supporting the plates in the bottom of each cell further increases the circulation of the electrolyte through the cell and increases the overall efficiency of the battery. The formation of the structural parts as described thus provides a rugged battery construction having a high efficiency and long useful service life under extreme conditions. The mechanical joints between the terminal posts and the plate straps are eliminated and the mechanical joints between the cell straps and the cell terminal posts have been improved to provide a tight connection which is not readily affected by any forces imposed thereon tending to cause a separation of the parts or relative movement therebetween.

Having thus described our invention, we claim:

1. A storage battery of the lead acid type including a casing partitioned into a plurality of cells, a plurality of apertured bridge members positioned in the bottom of each cell, and a plurality of alternately disposed positive and negative plates positioned at right angles to the bridge members, each of said plates comprising a lightweight, flexible, electrically conductive metal grid having a densified tightly adherent coating of pure lead thereon, a dielectric separator disposed between each positive and negative plate and resting on the bridge members, each separator having a plurality of spaced ribs extending toward the adjacent positive plate to define channels for the flow of electrolyte so as to assist in carrying away gas evolved at the surface of the positive plates, a strap member interconnecting the positive plates and another strap member interconnecting the negative plates, each strap member comprising an integral post and bar member formed of a lightweight electrically conductive metal, the bar portion of said member having a series of parallel slots formed therein, and a densified tightly adherent coating of pure lead completely covering said bar and post member, edge portions of the aforementioned plates being positioned in the aforementioned slots and fused with the lead coating on the bar.

2. A storage battery of the lead acid type including a plurality of cells, each cell containing a plurality of positive plates and a plurality of negative plates, each of said plates comprising a lightweight, flexible, electrically conductive metal grid having a densified tightly adherent coating of pure lead thereon, a dielectric separator disposed between each positive and negative plate, each separator having a plurality of spaced ribs extending toward the adjacent positive plate to define channels for the flow of electrolyte so as to assist in carrying away gas evolved at the surface of the positive plates; a strap member interconnecting the positive plates and another strap member interconnecting the negative plates each strap member comprising a lightweight electrically conductive metal bar having a series of parallel slots formed therein and having a post formed integrally therewith, and a densified tightly adherent coating of pure lead completely covering said bar and post, edge portions of the aforementioned plates being positioned in the slots and fused with the lead coating on the bar, a cell connector interconnecting at least one of each cell's posts with a post in an adjacent cell, each connector comprising a core member of electrically conductive metal and a densified tightly adherent coating of pure lead completely covering said core member.

References Cited in the file of this patent

UNITED STATES PATENTS

| 441,959 | Kennedy | Dec. 2, 1890 |
| 543,055 | Rooney | July 23, 1895 |
| 715,343 | Blanc | Dec. 9, 1902 |
| 1,126,671 | Wilson | Jan. 26, 1915 |
| 1,240,280 | Wilson | Sept. 18, 1917 |
| 1,296,961 | Irwin | Mar. 11, 1919 |
| 2,381,140 | Proctor | Aug. 7, 1945 |

FOREIGN PATENTS

| 549,037 | Great Britain | Nov. 3, 1942 |